March 13, 1951 J. G. DAHLEM 2,544,917

AIRPORT FUELING APPARATUS

Filed Dec. 31, 1947 11 Sheets-Sheet 1

INVENTOR.
J. Gordon Dahlem,
BY Wilkinson, Huxley, Byron & Hume
Attys

INVENTOR.
J. Gordon Dahlem,
BY
Atkinson, Huxley, Byron & Hume
Attys.

March 13, 1951 J. G. DAHLEM 2,544,917

AIRPORT FUELING APPARATUS

Filed Dec. 31, 1947 11 Sheets-Sheet 3

INVENTOR.
J. Gordon Dahlem,
BY
Aitchinson, Huxley
Byron & Hume
attys

AIRPORT FUELING APPARATUS

Filed Dec. 31, 1947

INVENTOR.
J. Gordon Dahlem,
BY
Wilkinson, Huxley, Byron & Hume
attys

March 13, 1951 J. G. DAHLEM 2,544,917

AIRPORT FUELING APPARATUS

Filed Dec. 31, 1947 11 Sheets-Sheet 5

INVENTOR.
J. Gordon Dahlem,
BY Wilkinson, Huxley, Byron & Hume
Attys.

March 13, 1951 J. G. DAHLEM 2,544,917

AIRPORT FUELING APPARATUS

Filed Dec. 31, 1947 11 Sheets-Sheet 6

INVENTOR.

J. Gordon Dahlem,

BY Wilkinson, Huxley, Byron & Hume

Attys.

March 13, 1951 J. G. DAHLEM 2,544,917

AIRPORT FUELING APPARATUS

Filed Dec. 31, 1947 11 Sheets-Sheet 7

INVENTOR.
J. Gordon Dahlem,
BY Atkinson, Huxley Byron & Hume
attys.

INVENTOR.
J. Gordon Dahlem,
BY Wilkinson, Huxley, Byrne & Hume
Attys.

March 13, 1951 J. G. DAHLEM 2,544,917

AIRPORT FUELING APPARATUS

Filed Dec. 31, 1947 11 Sheets-Sheet 9

INVENTOR.
J. Gordon Dahlem,
BY
Wilkinson, Huxley, Byron & Hume
attys.

March 13, 1951 J. G. DAHLEM 2,544,917

AIRPORT FUELING APPARATUS

Filed Dec. 31, 1947 11 Sheets-Sheet 10

INVENTOR.
J. Gordon Dahlem,
BY Wilkinson, Huxley, Byron & Hume
Attys.

March 13, 1951 J. G. DAHLEM 2,544,917

AIRPORT FUELING APPARATUS

Filed Dec. 31, 1947 11 Sheets-Sheet 11

INVENTOR.
J. Gordon Dahlem,
BY
Atkinson, Huxley, Byron & Hume
Attys.

Patented Mar. 13, 1951 2,544,917

UNITED STATES PATENT OFFICE 2,544,917

AIRPORT FUELING APPARATUS

J. Gordon Dahlem, Fort Wayne, Ind., assignor to The Wayne Pump Company, Fort Wayne, Ind., a corporation of Maryland Application December 31, 1947, Serial No. 795,076

10 Claims. (Cl. 222—23)

This invention relates to liquid dispensing apparatus, and more particularly to fuel dispensing mechanism which permits high speed delivery of fuel at a relatively low pressure through a flexible, collapsible hose which may be easily handled and controlled during and between dispensing operations. These characteristics make the system readily adaptable as an aircraft fueling device.

Because of its novel construction the system contemplated herein may be used with any of the commonly used sources of fuel supply. If a remote, stationary storage tank is utilized, the dispensing apparatus may be disposed in a pit, cabinet, or similar housing. If a mobile source of fuel supply is used, the dispensing mechanism may be mounted on a vehicle, which may be equipped with a power take-off to operate the dispensing apparatus. Or a mobile storage vehicle may be used for the mechanism, in which case the mechanism is connected to selected fuel outlets. This adaptability is significant since the commercial airlines, which have the problem of rapidly fueling large planes having a very large fuel carrying capacity, have preferred to use mobile sources of supply, whereas the so-called fueling pit system has been widely used in installations designed to service planes of smaller size than the commercial transports. The desirability of fueling military planes rapidly and easily is, of course, obvious.

It is also desirable to employ a fueling system that can be readily operated by a single attendant, which is feasible only when the system can be controlled readily and simply. In addition, a hose that can be easily handled is necessary, since a considerable amount of movement from one fueling point to another is required when fueling the larger planes. This problem is overcome in the system herein disclosed by normally maintaining the hose in a collapsed, exhausted condition when fuel is not being dispensed, the fuel being withdrawn from the hose after each dispensing operation, if desired.

The hose, therefore, can be easily handled and stored, even though it has a relatively large diameter. This feature also makes the system readily adaptable to the method of fueling from the lower surface of the wing of the plane, since the hose is put in a dry condition before being detached from the fuel intake point.

The measurement of the amount of fuel actually dispensed by such a system as herein disclosed is complicated by the fact that, in effect, a combination wet and dry hose system is used, since the dispensing hose must be filled with liquid before dispensing is begun, and the liquid remaining in the hose after dispensing is stopped, is pumped back out of the hose and returned to the source of supply. The present system, therefore, includes a meter operated by the flow of liquid as it is pumped, and a register adapted to be operated by that meter so that a true reading of dispensed liquid is obtained.

It is, therefore, an object of this invention to provide a fueling apparatus enabling the high speed delivery of fuel at a relatively low pressure.

It is a further object to provide a fueling apparatus wherein the dispensing hose is normally in a collapsed, exhausted condition when fuel is not being dispensed, and can therefore be stored in dry condition.

It is a further object to provide a fueling apparatus in which the dispensing and the evacuating operations are both controllable at one point.

It is a further object to provide a fueling apparatus which may be easily and efficiently operated only by one attendant.

It is a further object to provide a fueling apparatus which registers only the amount of liquid dispensed even though liquid is pumped into and back out of the dispensing hose as before and after a dispensing operation.

It is a further object of the invention to provide a fueling apparatus which is compact, complete and simple, and easy to use.

It is a further object of the invention to provide an apparatus which can be adapted to the several methods of fueling now in use.

It is a further object of the invention to provide an apparatus which will reduce the hazards incident to fueling aircraft by reducing the amount of gasoline stored in hoses at the airport or in the fueling pit.

It is a further object of the invention to provide an apparatus which will further reduce the hazards incident to fueling aircraft by making it necessary to bond together electrically all of the elements of the system and to ground the vehicle to be fueled before one attendant can dispense fuel.

A further object of the invention is to provide fueling and defueling apparatus wherein part of the control mechanism comprises a four-way valve of balanced type which will effectively seal against leakages in at least the evacuating or defueling position of the valves.

A further object of the invention is to provide fueling and defueling apparatus wherein part of the control mechanism comprises a four-way valve of balanced type wherein the seats of said valve are fixed and the poppets are balanced, one being a floating poppet which is the first to seat to insure absolute seating of both valves.

A further object of the invention is to provide fueling and defueling apparatus wherein part of the control mechanism comprises a four-way valve of balanced type wherein the poppets are urged toward seated position to place the apparatus in evacuating or defueling condition.

A further object of the invention is to provide fueling and defueling apparatus wherein part of the control mechanism comprises a four-way valve of balanced type having an operating handle operative to condition the valve for dispensing when the control circuit of the system is complete, and wherein if any circuit is broken, the handle cannot be operated to open the poppets of the valve, and if the poppets are open at the time the circuit is broken, the handle is released and the valves are closed.

It is a further object of the invention to provide a fueling system which is adapted for fueling and defueling by simple manual actuation of valve mechanism.

It is a further object of the invention to provide a fueling and defueling apparatus which is rendered inoperative after a predetermined amount of fuel is supplied to the fuel receiving receptacle.

With these and various other objects in view, the invention consists of certain novel features of construction and operation as will be more fully described and particularly pointed out in the specification, drawings and claims appended hereto.

In the drawings which illustrate embodiments of the device and wherein like reference characters are used to designate like parts—

Figures 1, 2:
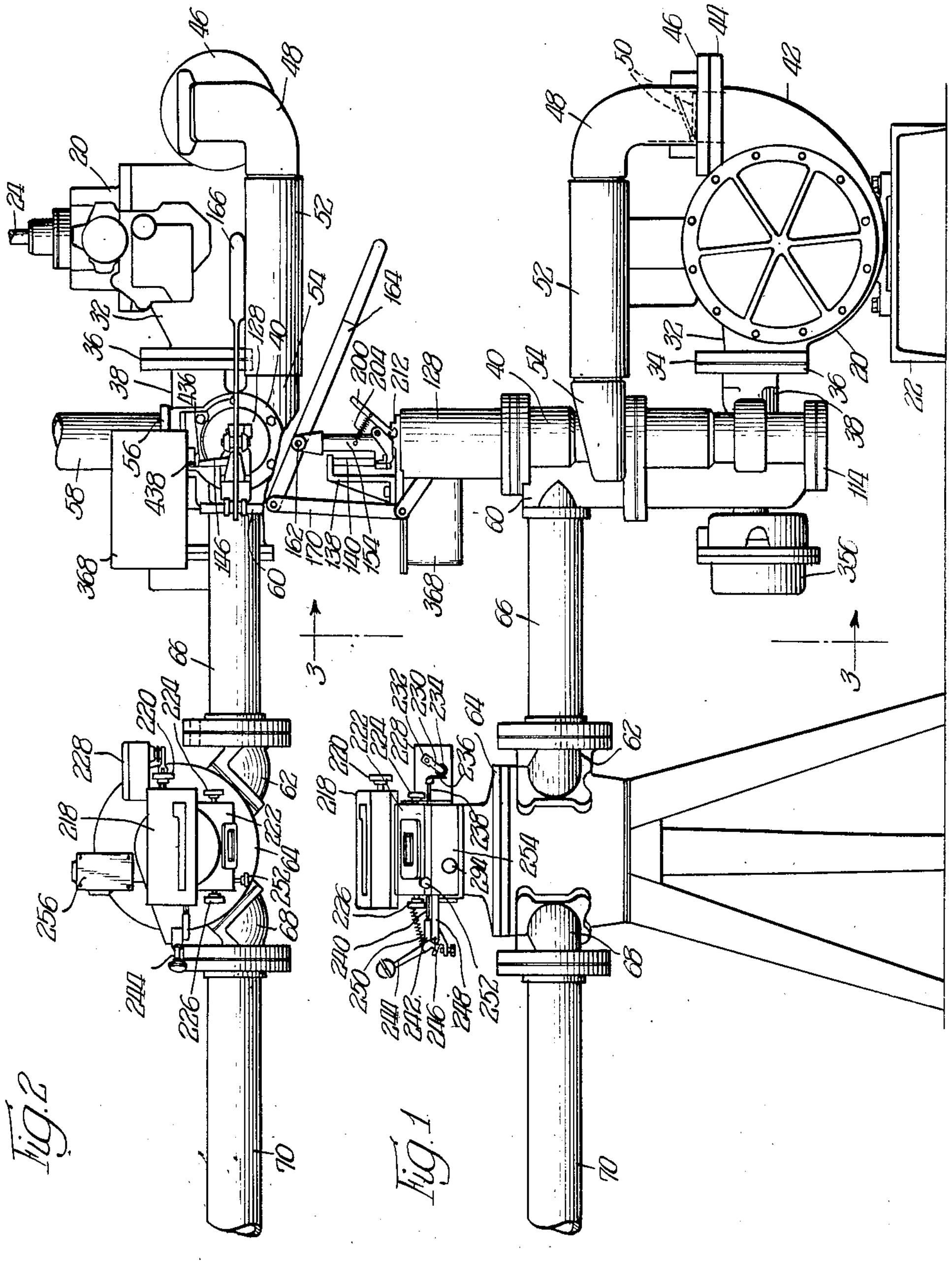
Figure 1 is a side elevation of a form of dispensing apparatus embodying the invention.
Figure 2 is a top plan view of the dispensing apparatus illustrated in Figure 1.
Figure 3:
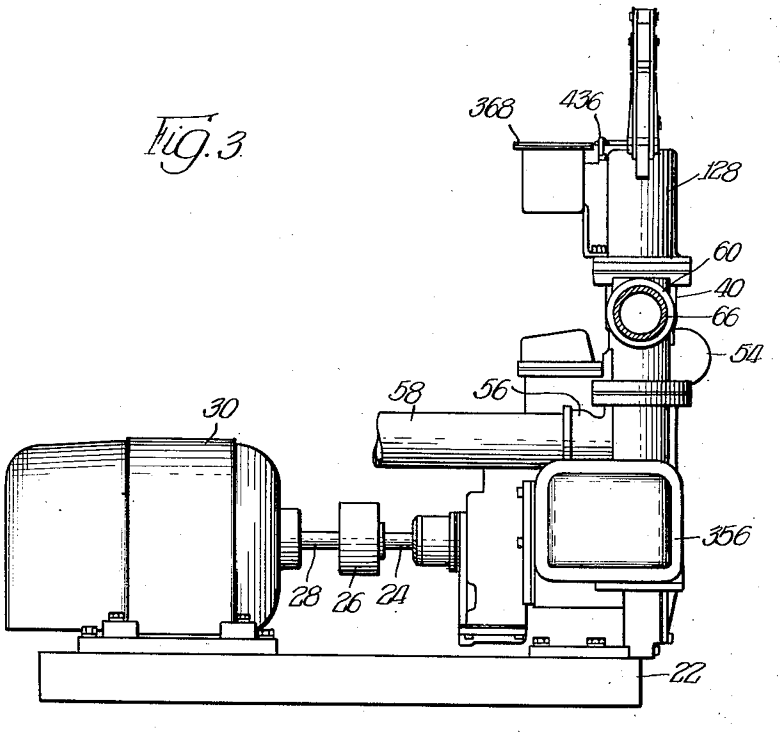
Figure 3 is an elevation, partly in section, of the dispensing apparatus illustrated in Figures 1 and 2, the section being taken substantially in the plane as indicated by the line 3—3 of Figure 1.

Referring first of all more particularly to the liquid dispensing apparatus illustrated in Figures 1 to 3 inclusive, said apparatus comprises a pump 20 of any suitable construction such as illustrated in United States Letters Patent No. 2,384,172, Jauch and Hinds, granted September 4, 1945, the pump being supported on a suitable support 22 and provided with the impeller shaft 24 coupled as at 26 to the motor shaft 28 of a motor 30. While an electric motor 30 is shown, it is of course understood that any other suitable operating means may be used.

The pump inlet 32 (Figures 1, 2, 9 and 10) is connected as by the flange 34 to the flange 36 of the passage containing connection 38 of the balanced four-way valve housing or casing 40 (Figures 1, 2, 4 to 10) and the pump outlet 42 is provided with the flange 44 which is connected to the flange 46 of the fitting 48 in which the check valve 50 is disposed, said check valve being adapted to be opened by the pressure of the fluid supplied by the pump from its outlet toward said four-way valve.

Fitting 48 is connected as through piping 52 to the connection 54 (Figures 1, 2, 4, 6, 8, 9 and 10) of the casing 40. The casing 40 is provided with an inlet connection 56 (Figures 2, and 3 to 10) connected through a suitable pipe 58 to a source of fluid supply (not shown). The casing 40 is also provided with the outlet connection 60 adapted to be connected to the inlet 62 of the meter 64 through connection 66.

The meter 64 is a suitable displacement meter provided with a rotatable meter shaft (not shown) which is adapted to be rotated in accordance with the fluid passing through the meter, the meter being provided with the outlet 68 connected to selected dispensing means 70, which may be the inlet of a reel connected to a flexible collapsible hose such as shown in United States Letters Patent No. 2,362,559, Jauch and Sturm, granted November 14, 1944, which hose is adapted to be provided with a suitable nozzle such as shown in said last named patent, or United States Letters Patent No. 2,461,312, granted February 8, 1949 to J. Gordon Dahlem (applicant herein), or United States application for Letters Patent Serial No. 593,558, Jauch et al., filed May 14, 1945.

The passage of connection 38 of the casing 40 which is connected to the inlet 32 of the pump 20, communicates with the port 72 (Figures 5, 7, 9 and 10) which in turn communicates, through the valve seat 74, with the supply port 76 which communicates with the fitting 56, said fitting 56 being connected through the pipe 58 to the source of fluid supply.

Casing 40 is provided with the valve guides 78 and 80 (Figures 5 and 7) for reception of the lower poppet 82 movably mounted on the reduced end 84 of the valve stem 86. A spring 88 is disposed between the poppet 82 and a retainer or spring seat 90 provided on the reduced end 84, the spring urging the poppet toward the shoulder 92. The poppet is provided with suitable leakage preventing packing 94 and the seat facing 96 retained or secured to the poppet as at 98. The stem 86 of the poppet 82 is adapted, in the position shown in Figures 7 and 10, to seat upon seat 74 thereby cutting off communication between the port 72 and the port 76.

The casing 40 is also provided with the valve guides 100 and 102 disposed on opposite sides of the port 104 which is connected to the pump discharge through the fitting 54. The casing is also provided with a valve seat 106 disposed adjacent guide 100 and disposed intermediate port 104 and the by-pass passage 108 disposed in the casing 40, passage 108 communicating through port 110 with the side of poppet 82 opposite to the facing 96, and communicating through passage 112 of fitting 60, with piping 66. The lower end of casing 40 is closed by means of the cap 114 removably secured thereto.

Figures 7, 8:
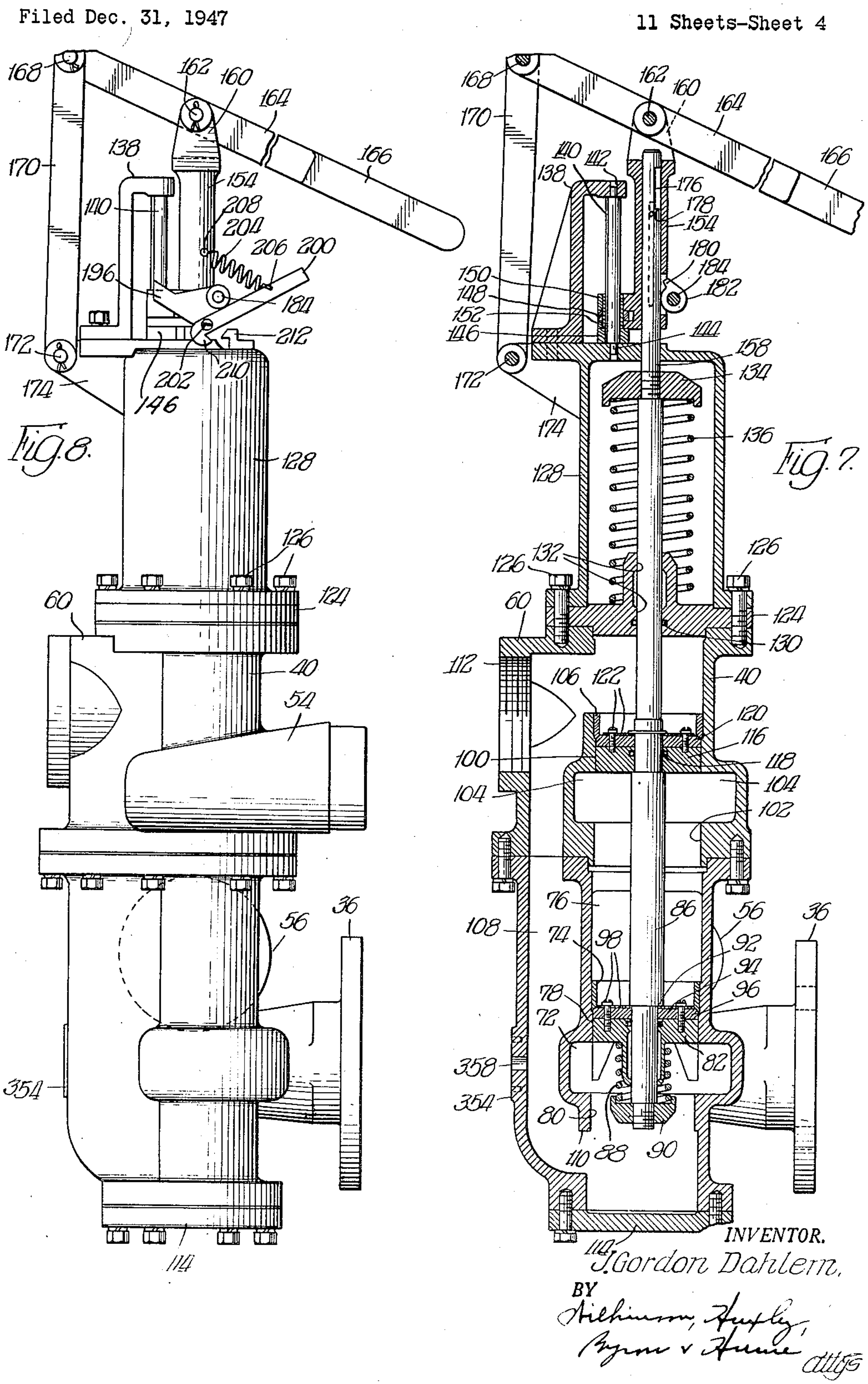
Figure 7 is a sectional elevation corresponding to Figure 5 showing the valves in closed or evacuating position.
Figure 8 is an elevation corresponding to Figure 4 showing the latch mechanism in inoperative or disengaged position, i. e., in position when the valves are in closed position as shown in Figures 7 and 10.
Figure 9:
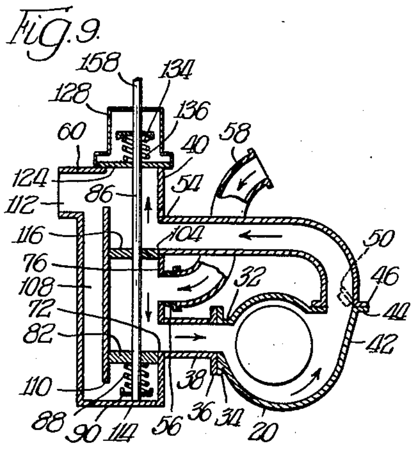
Figure 9 is a diagrammatic sectional view of the pump and four-way valve showing the parts in position during the delivery cycle, i. e., where the valves of the four-way valve are in the positions shown in Figure 5.

Upper poppet 116 is fixed to the valve stem 86 and is provided with leakage preventing packing 118 and facing 120 is adapted to seat on the seat 106 when the valve is in position as shown in Figures 7 and 9, the facing 120 being retained in position on the poppet by means of securing means 122. The fixed poppet 116 is adapted to seat after the movable poppet 82 to insure both seating tightly. Thus, in effect poppets 82 and 116 slide in inner cylinder 123 which cylinder is provided ports 72, 76 and 104, the cylinder being spaced from casing 40 to form passage 108.

Figure 10:
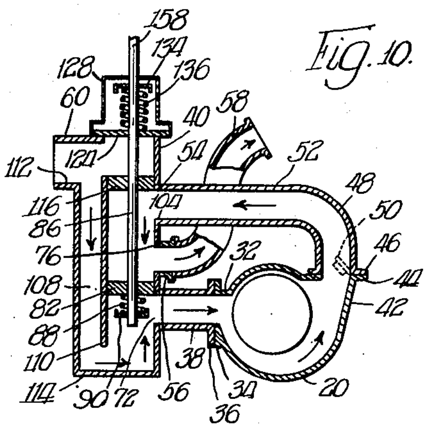
Figure 10 is a diagrammatic sectional elevation of the pump and four-way valve showing the parts in position during the evacuating cycle, i. e., where the valves of the four-way valve are in the position shown in Figure 7.

The upper end of casing 40 (and upper part of passage 108) is closed by means of closure plate 124 secured to the casing as by securing means 126, the dome or housing 128 being also secured to said casing by the securing means 126. The closure plate 124 is provided with the leakage preventing packing 130 (Figures 5 and 7) and spaced stem guides 132, the valve stem 86 extending through the closure plate (and guides). The stem within dome 128 is provided with the spring seat 134, spring 136 being disposed between the seat 134 and the closure plate 124 urging the poppets 82 and 116 toward closed positions as illustrated in Figures 7 and 10. Bracket 138 is fixed to the top of the dome 128 and the opposite ends of rotatable shaft 140 are journalled in the bracket 138 as at 142, and in the top of the dome 128 as at 144.

Latch operating lever 146 (Figures 6, 2, 4 to 8) is fixed to the shaft 140 and latch 148 is non-rotatably but slidably mounted on the shaft 140 being disposed between spaced lugs 150 and 152 (Figures 5 and 7) of valve operating housing 154, said housing provided with the passage 156 for receiving the upper end 158 of the valve stem 86. The upper end of housing 154 is provided with the spaced lugs or brackets 160 pivoted as at 162 to the operating handle 164 intermediate the ends thereof, one end 166 of the handle being adapted to be manually moved, the opposite end of the said handle being pivoted as at 168 to one end of the links 170, the other end of said links 170 being pivotally mounted as at 172 to the bracket 174 provided on the dome 128.

Figures 4, 5:
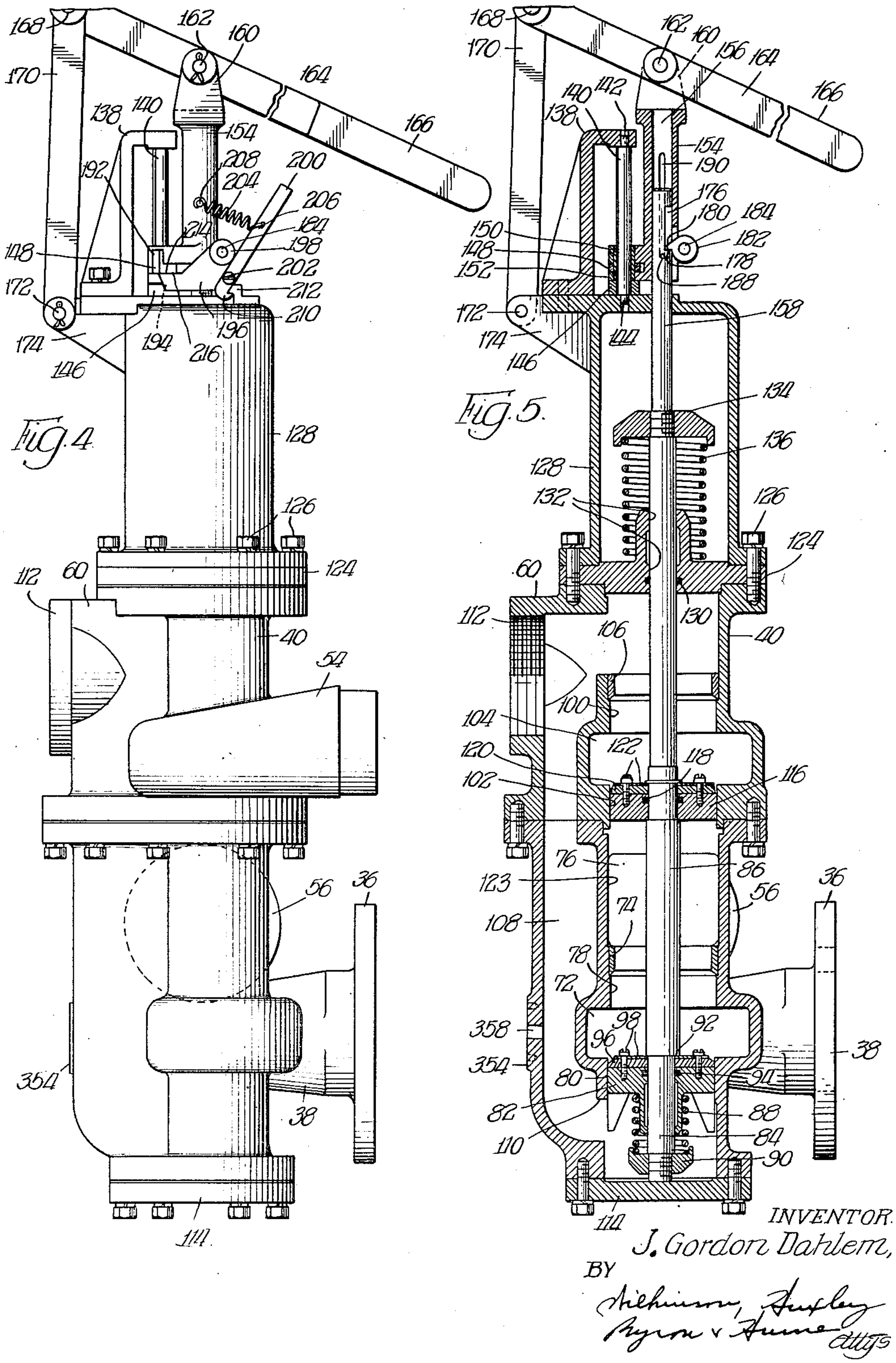
Figure 4 is an elevation of a form of balanced four-way valve utilized in the dispensing apparatus illustrated in Figures 1 to 3 inclusive, the latch mechanism being in latched or engaged position, i. e., when the valves are in open or dispensing position as shown in Figures 5 and 9.
Figure 5 is a sectional elevation of the valve illustrated in Figure 4, the same being taken substantially in the plane as indicated by the line 5—5 of Figure 6 and showing the valves in open or dispensing position.

The upper end 158 which is disposed within the housing 154 is provided with the notch 176 (Figures 5 and 7) providing a shoulder 178 adapted to be engaged by the lug 180 of the latch collar 182, collar 182 being secured to shaft 184 pivotally mounted on the housing 154 through spaced ears 186 (Figure 6) provided on the housing 154. In order to maintain the recess 176 in alignment with the lug 180, the upper end 158 of valve stem 86 is prevented from rotation with respect to the housing 154 by the pin and slot connection 188 and 190 (Figures 5 and 7).

Latch 148 is provided with the blocking face 192 (Figures 6 and 4) adapted to cooperate with another blocking face 194 provided on lever 196 (Figures 4, 6 and 8) fixed through hub 198 to shaft 184. Latch 200 is pivoted intermediate its ends as at 202 to the lever 196, the latch being urged in a counter-clockwise or latching direction as viewed in Figures 1, 4 and 8 by means of spring 204, one end of the spring being connected as at 206 to the latch 200, the other end of said spring being connected as at 208 to the housing 154. The latching end or shoulder 210 (under conditions to be later described) is adapted to have latching engagement with the fixed latching member 212 secured to the top of dome 128. The bottom face 214 of the latch 148 (Figure 4) is adapted to overlie the top face 216 of the lever 196 for preventing clockwise rotation of the lever 196 and consequently the shaft 184 as viewed in Figure 4.

The meter 64 (Figures 1 and 2), provided with the aforementioned meter shaft (not shown), is adapted to operate the register or counter 218 for showing the amount of liquid passing through the meter, the counter being adapted to be reset by the usual reset knob 220. The preselecting register counter 222 is provided with the preselecting knobs 224 and 226 for setting the counter 222 to the selected number of units to be discharged, as for example, gallons.

The switch 228 (Figures 1, 2 and 21) is disposed adjacent the register 222 being provided with the switch arm 230 rotatable with the shaft 232 and provided with the lower follower 234 engaging the shoe 236 of the reciprocally mounted rod 238. Reciprocation of the rod 238 is controlled by the rod 240 pivoted as at 242 to the operating lever 244 which is pivoted as at 246 to the bracket 248.

Spring 250 is connected at one end to the lever 244 and at the other end to the casing of register 222, said spring urging the lever 244 toward the right as viewed in Figure 1, i. e., to a position where the switch 228 is in open condition. Rotation of the lever 244 in a counter-clockwise direction as viewed in Figure 1, to a position where it is latched downwardly, moves the rod 238 to permit the arm 230 to be moved to a position where switch 228 is closed. When the switch 228 is closed, dispensing may occur and when the selected number of units have been dispensed rod 240 is released permitting the rod 238 to be moved to the left as viewed in Figure 1 to permit the switch 228 to open. Button 252 may be operated any time to open the switch 228 by effecting release of rod 240 and consequent movement of the rod 238 to the left as viewed in Figure 1 to permit the arm 230 to move the switch 228 to open position.

Interposed between the meter 64 and the registers 222 and 218 there is disposed engaging and disengaging mechanism (Figures 1, 2, 11 to 14) in the casing 254 which in turn is provided with the solenoid housing 256 (Figures 11, 12 and 21) in which solenoid 258 is disposed. Solenoid 258 is provided with the armature 260 connected to the operating rod 262 which extends into housing 254 and is pivoted as at 264 to the lower lever 266 (Figures 11 and 14), said lever being pivoted as at 268 to the casing 254.

Figure 11:
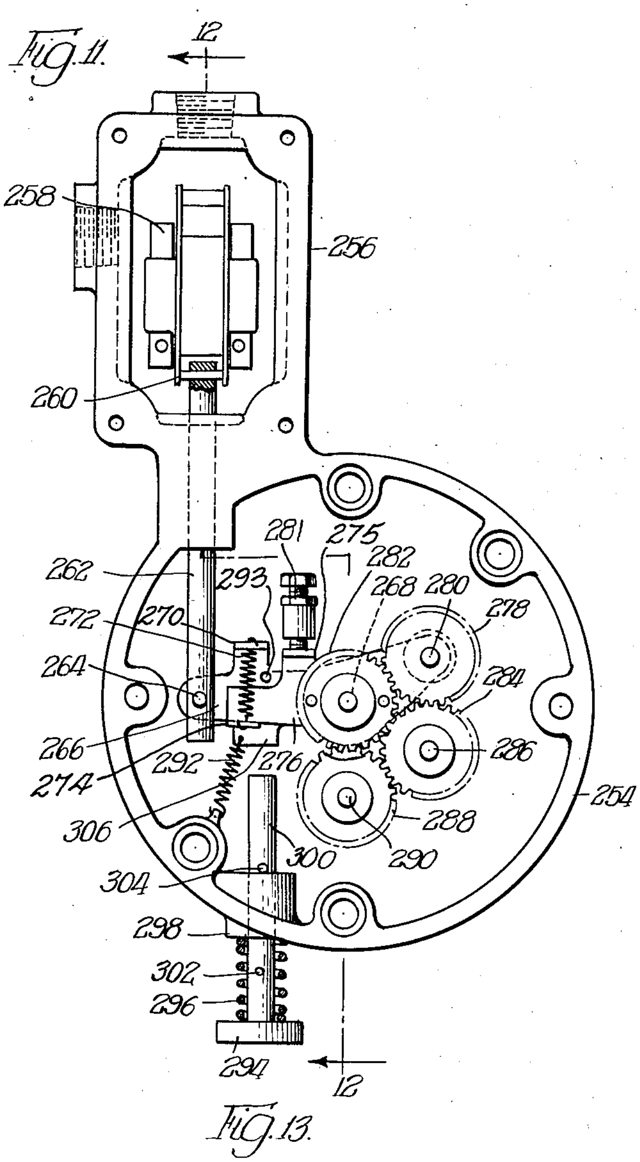
Figure 11 is an enlarged plan view of the counter engaging and disengaging adapter for use with a reversible counter.
Figure 12:
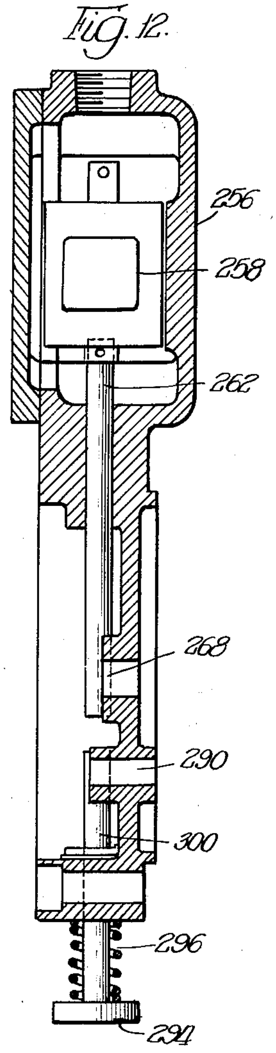
Figure 12 is a sectional elevation taken substantially in the plane as indicated by the line 12—12 of Figure 11.
Figure 13:
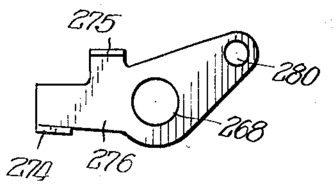
Figure 13 is a plan view of the bell crank upper lever of the adapter shown in Figure 11.
Figure 14:
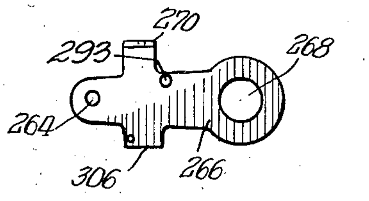
Figure 14 is a plan view of the lower lever of the adapter shown in Figure 11.

Lever 266 is provided with the bent ear 270 to which one end of the spring 272 is secured, the other end of said spring 272 being connected to the bent ear 274 of one arm of upper bent crank lever 276 (Figures 11 and 13). Crank lever 276 is pivoted as at 268 to casing 254 and the other arm of said lever is provided with the wide face idler gear 278 pivoted to said last-named (other) arm of said lever 276 as at 280. Lever 276 is also provided with a stop ear 275 adapted to have adjustable abutment with the adjustable stop 281. Idler 278 meshes with gear 282 pivoted as at 268 and suitably connected to means for driving the registers 222 and 218. Idler 278 is adapted to mesh with idler 284 which is in a different plane than gear 282, idler 284 being pivoted to the casing as at 286 and meshing with the drive gear 288 mounted on the meter driven shaft 290 connected to the meter shaft not shown. Gear 288 is in the same plane as gear 284 so that gear 288 drives gear 282 only through gears 284 and 278.

Lower lever 266 is connected to one end of spring 292, the opposite end of said spring being connected to the casing 254. It will thus be seen that spring 292 urges lever 266 in a counter-clockwise direction as viewed in Figure 11, which, in turn, urges upper lever 276 in a counter-clockwise direction by pin 293, i. e., in a direction to disengage gear 278 from gear 284.

When the solenoid 258 is energized rod 262 will move in a direction to rotate lever 266 in a clockwise direction as viewed in Figure 11, to cause spring 272 to move lever 276 in a clockwise direction, limited by stop 281, to cause gear 278 to mesh with gear 284. In order to manually operate the engagement of gear 278 with gear 284, push button 294 is provided urged outwardly by means of the spring 296 interposed between the button 294 and the spring seat 298 provided on the housing 254. Push button 294 is provided with the plunger 300 limited in its movement by means of pins 302 and 304, the inner end of said plunger 300 being adapted to engage the edge of leg 306 of lever 266 for moving the lever in a clockwise direction to engage gear 278 with gear 284.

Figure 15:
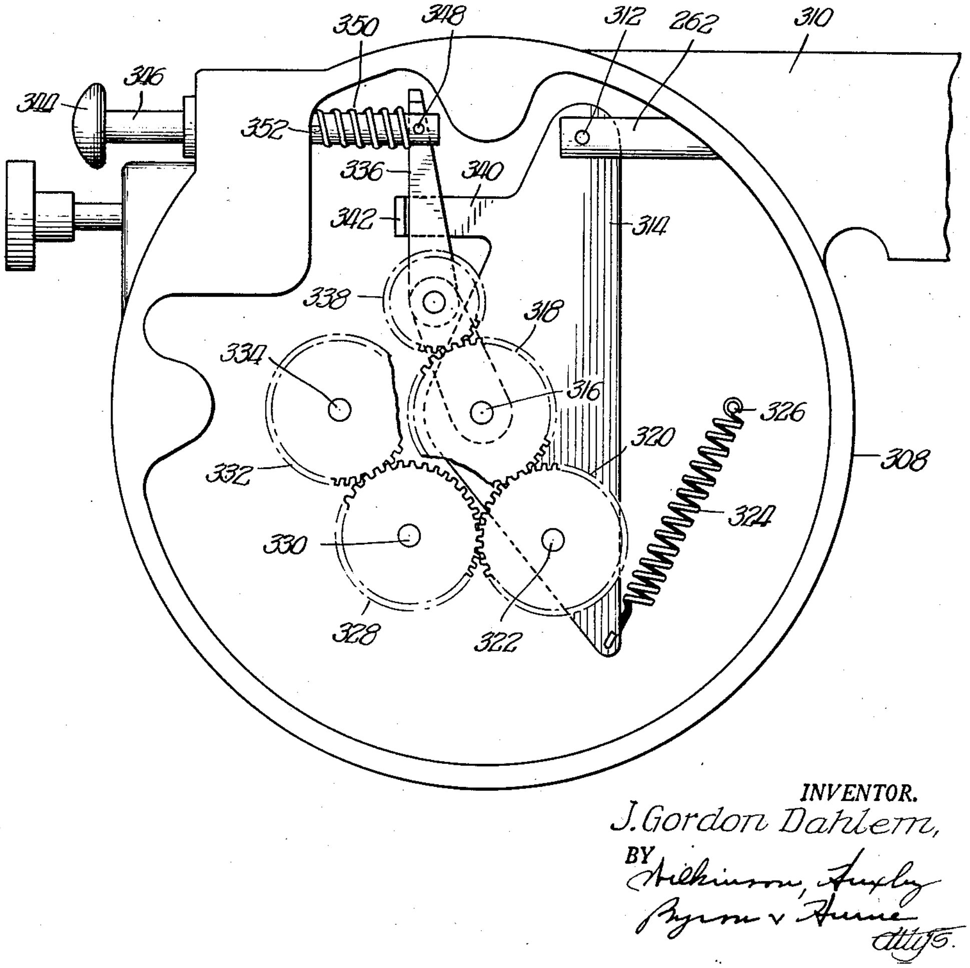
Figure 15 is an enlarged plan view of an engaging and disengaging adapter for use with a counter incapable of being run in a reverse direction.

With the description above referred to in connection with Figures 11 to 14, it is understood that counters 218 and 222 must be capable of being run in a reverse direction; however, if they are not capable of being run in a reverse direction, it will be necessary to use the construction illustrated in Figure 15 in place of that shown in Figures 11 to 14. In using the construction shown in Figure 15, the housing 308 and the mechanism contained therein replaces housing 254 and its mechanism. Housing 308 is adapted to communicate with solenoid housing 256 through the boss 310, and the solenoid operated rod 262 extends into the housing 308 and is pivoted as at 312 to the lever 314 which in turn is pivoted at 316 to the casing 308.

Gear 318 also is pivoted at 316 and is a driven gear similar to gear 282 (Figure 11) being suitably connected to drive the registers 222 and 218. Gear 318 meshes with wide face gear 320 pivotally mounted as at 322 on the lever 314. One end of spring 324 is connected to lever 314, the other end of said spring being connected as at 326 to casing 308 urging the lever in a counter-clockwise direction about pivot 316 (Figure 15), whereby said wide face gear 320 is urged in a direction to disengage said gear from idler gear 328 pivotally mounted as at 330 to the casing 308 and being in a plane different from the plane of gear 318 whereby gear 328 can only be connected to gear 318 through gear 320. Gear 328 meshes with the drive gear 332 mounted on meter driven shaft 334, gear 332 being in the plane of gear 328.

Manually controlled reverse lever 336 is pivotally connected as at 316 to intermediate gear 318 and lever 314, lever 336 being provided with the wide faced idler gear 338 which meshes with gear 318 and can be moved by lever 336 to mesh with gear 332. When gear 338 meshes with gear 332 it is necessary to disengage gear 320 from gear 328 and to cause this disengagement lever 314 is provided with the ear 340 provided with the upturned lug 342 engaging lever 336 whereby movement of the lever 336 in counter-clockwise direction moves lever 314 in a counter-clockwise direction to insure disengagement of gear 320 from gear 328 when gear 338 is in engagement with gear 332. Manual operation of the lever 336 can be effected through button 344 (similar to button 294) the button being provided with the pull rod 346 pivotally connected as at 348 to lever 336, spring 350 being interposed between the lever 336 and the spring seat 352 of housing 308 normally urging the lever 336 to a position where gear 338 is disengaged from gear 332.

It is understood that where the meter 64 is disposed as shown in Figure 1, i. e., between the outlet 70 and the valve casing 40 of the four-way valve that where the meter can be reversed and the registers 222 and 218 run in a reverse direction, the mechanism illustrated in Figures 11 to 14 is adapted to be used. Where the meter can be run in a reverse direction but the registers 222 and 218 are not reversible, then the construction illustrated in Figure 15 is adapted to be used. It is also possible to place the meter 64 in the piping 52, i. e., between the outlet of the pump and the connection 54 of the valve casing 40, in which case the meter is adapted to be run in a reverse direction and the disengaging and engaging mechanism illustrated in Figures 11 to 14 is used.

Figure 18:
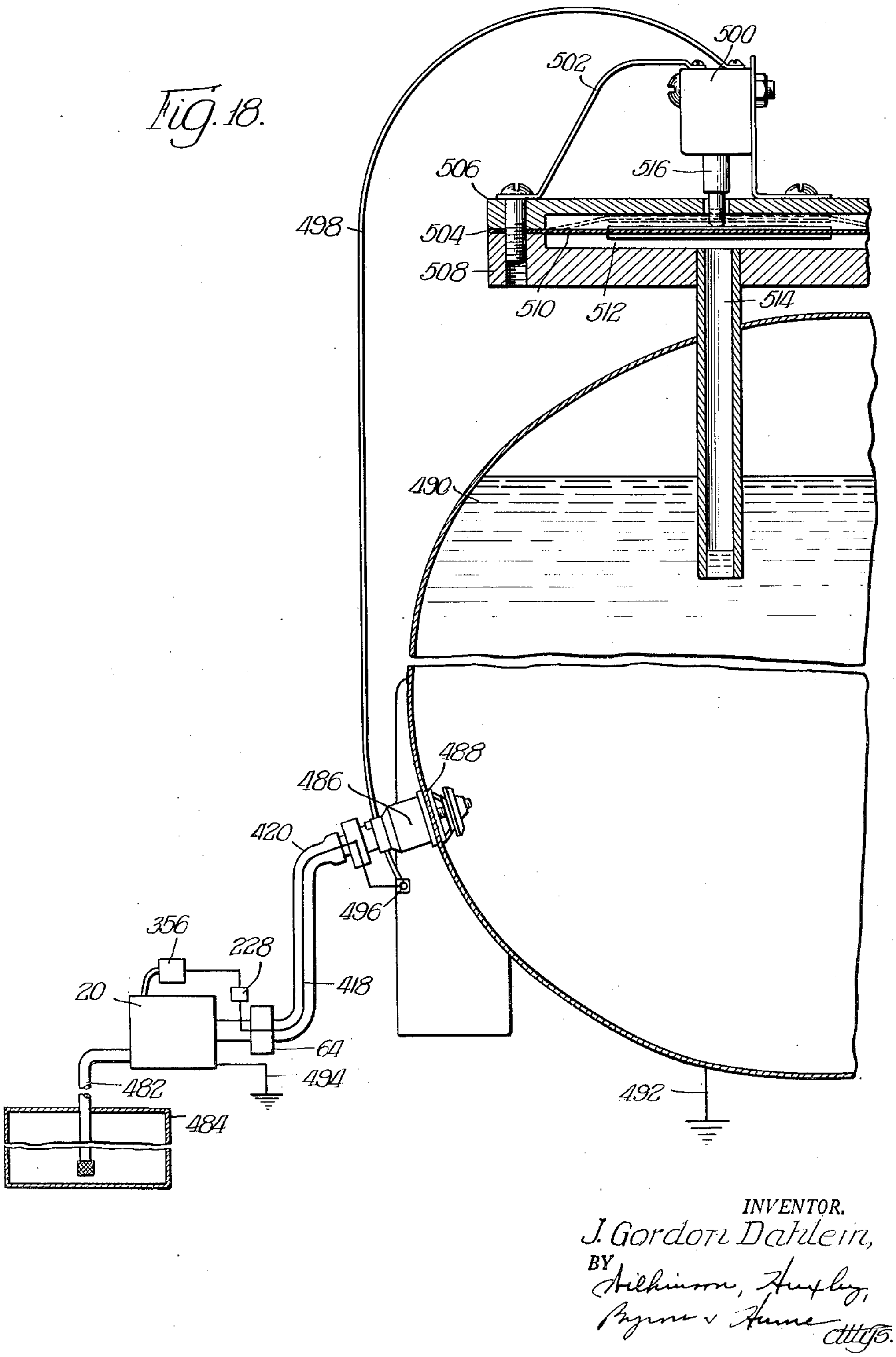
Figure 18 is a more or less diagrammatic sectional view showing the dispensing hose in position for fueling a tank and also showing a tank safety switch for limiting the amount of fluid supplied to the tank.
Figure 20:
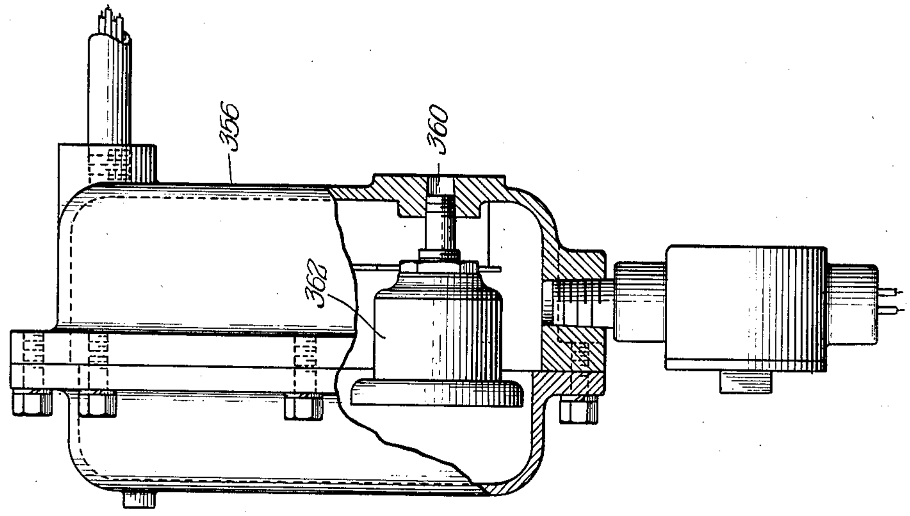
Figure 20 is a fragmentary sectional elevation of the box illustrated in Figure 19, the same looking toward the left as viewed in Figure 19.
Figure 19:
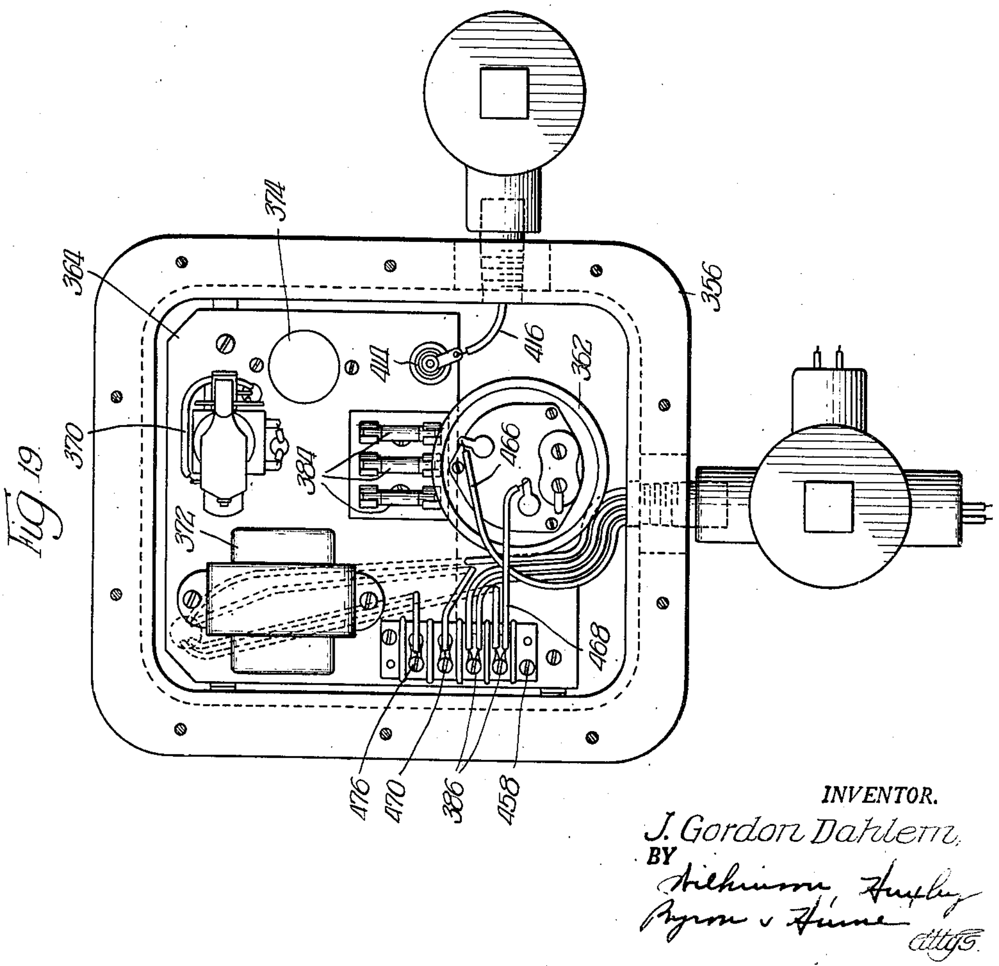
Figure 19 is an enlarged front elevation of the electronic control box for the herein described dispensing apparatus.
Figure 21:
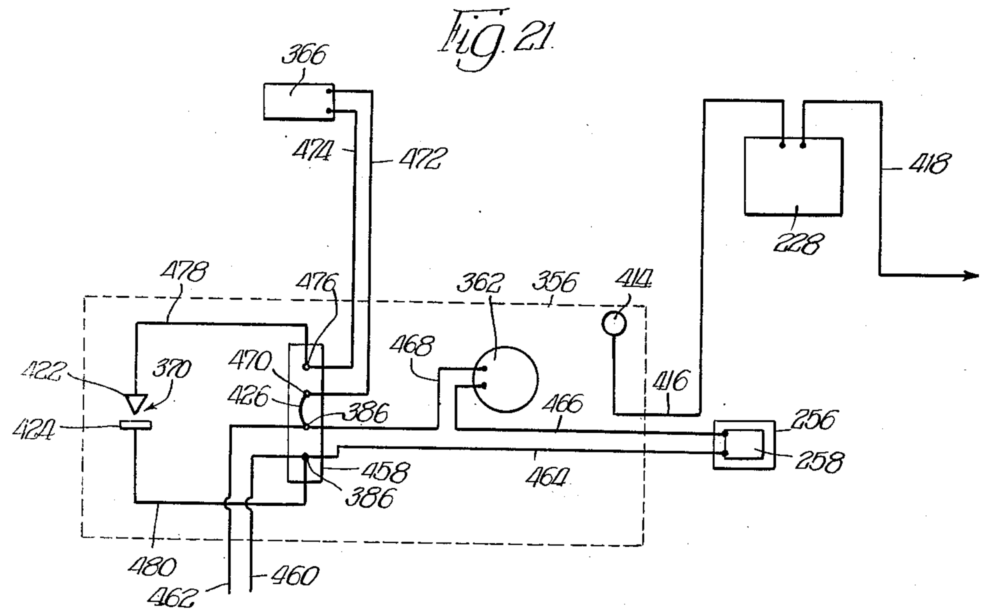
Figure 21 is a wiring diagram showing the circuiting for certain control mechanism of the apparatus illustrated in Figures 1 and 3 inclusive.

Casing 40 of the four-way valve (Figures 4 to 7) is provided with the flange face 354 to which the control box 356 (Figures 1, 18, 19, 20 and 21) is secured, and aperture 358 (Figures 5 and 7) provides communication between by-pass passage 108 and passage 360, communicating with the normally open pressure switch 362 (Figures 19, 20 and 21). When the pressure supplied to the switch 362 reaches a predetermined amount, the switch is closed.

The switch box 356 is provided with an electronic control mechanism on the control panel 364, the control being for the unlatching solenoid 366 (Figures 16, 17, 21, 22, 1, 2 and 3) provided in box 368. The control (Figures 19 and 22) includes a relay 370, transformer 372, vacuum tube 374, resistors 376 and 378, and condenser 380. The transformer primary 382 (Figure 22) is connected to a source of electrical energy which is here assumed to be alternating current (although direct current could be utilized with only slight modification) through fuses 384 and contacts 386. Application of this electrical energy causes the heaters of the tube 374 to bring the said tube to operating condition since a closed circuit exists from one end of the transformer secondary 388 through line 390, heater 392, heater 394, and line 396 to the other end of the transformer secondary. During the positive half cycle of the input voltage, current flows through line 390 from the transformer secondary 388 to the plate 398, to the cathode 400 and thence to plate 402 and screen 404 and therefrom to cathode 406 and through the coil 408 of relay 370 to line 396 and back to the transformer secondary 388.

Figure 22:
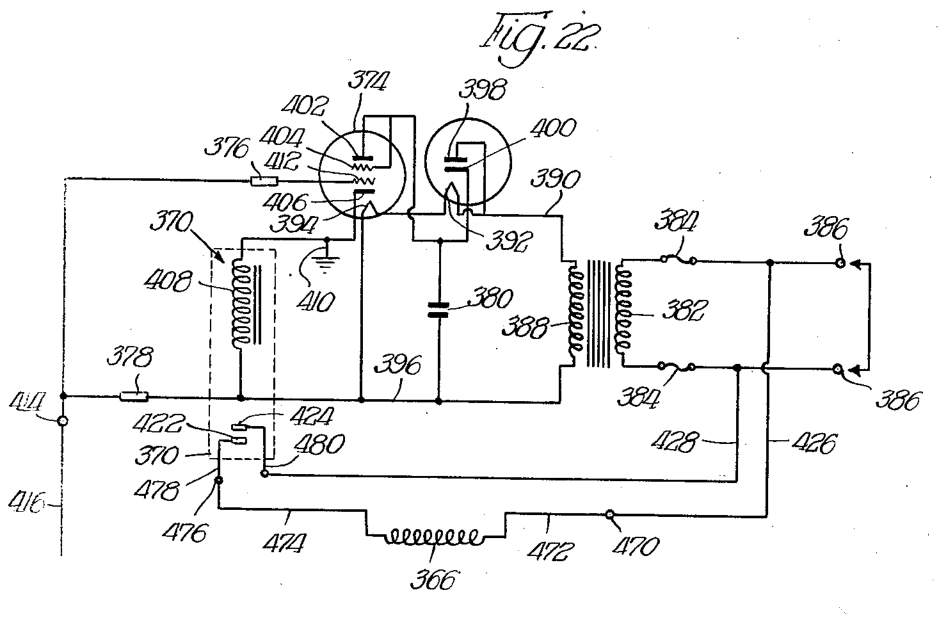
Figure 22 is a schematic wiring diagram for the electronic control equipment illustrated in Figures 19, 20 and 21.

The cathode 406 is connected to ground at 410, and the grid 412 is connected to resistor 376, the other side of which is connected to terminal post 414 (Figures 22 and 19). Also connected to the terminal post 414 is one side of the resistor 378, the other side of which is connected to the line 396. The control lead 416 connects to the static wire 418 (Figures 18 and 21) of hose 420 through switch 228. If the control line 416 is not grounded, a predetermined amount of current will flow through the tube, as indicated above, and through the relay 370 (Figure 22). This amount is not sufficient to close the relay contact points 422 and 424. The voltage drop existing across the coil of relay 370 is such as to apply a suitable negative bias via resistor 378 and control post 414 and resistor 376 to the grid 412 of the tube to maintain such small predetermined current.

However, if control post 414 is connected to ground through control line 416, the end of resistor 376 connected thereto is also effectively grounded, which removes the negative bias previously applied to the grid 412 and places it substantially at the same potential as the cathode 406, thus permitting a greater amount of current to flow from plate 402 to cathode 406 through the coil 408 of the relay 370, and back to the transformer secondary 388 through line 396. Such greater amount of current is sufficient to cause the relay points 424 and 422 to close, forming a closed circuit between contacts 386 through line 426, coil 366, contact points 422 and 424 and line 428. The closing of this circuit causes current to flow through coil 366 (Figures 22, 16 and 17) which moves the armature 430 to the position shown in Figures 16 and 17, i. e., toward the left as viewed in said figures.

Figure 24:
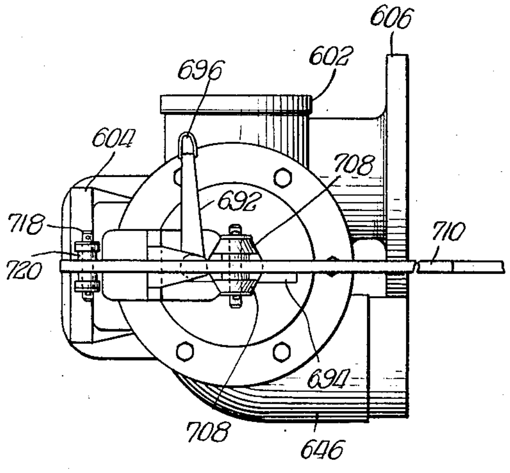
Figure 24 is a top plan view of the four-way valve shown in Figure 23.

The end of the solenoid armature 430 is provided with an antifriction roller which engages lever 432 pivotally mounted on shaft 434 which extends through the control box 368 and is provided with the pin 436 loosely engaged in the slotted opening 438 (Figures 2 and 6) (and slotted opening 696, Figure 24) in latch operating lever 146 (Figures 2 and 6) (and lever 692, Figure 24). One end of spring 440 is connected to pin 442 carried by one end of the lever 432 urging said lever in a counter-clockwise direction around the shaft 434, the other end of said spring 440 being connected as at 444 to the box 368. Lever 446 is fixedly connected to the shaft 434 and is provided with the bent ear 448 having flange 450 to which one end of spring 452 is connected, the other end of said spring being connected as at 454 to the box 368, said spring 452 urging the lever 446 in a clockwise direction. Lever 446 is provided with a bent lug 456 adapted to overlie and engage one edge of lever 432.

If the control line 416 (Figure 22) is again disconnected from the ground, the voltage existing across the coil 408 of relay 370 will again be applied as a bias through resistors 376 and 378 to the grid 412 and act to reduce the current passing from plate 402 to cathode 406 and through the relay coil 408. This current being insufficient to maintain contacts 424 and 422 closed, they will open, interrupting the circuit to the coil 366 (Figures 22, 16 and 17) which will permit spring 440 to move levers 432 and 446, shaft 434 and pin 436 in a counter-clockwise direction, as viewed in Figure 17, thus moving lever 146 in a counter-clockwise direction as viewed in Figures 2, 6 and 25.

The voltage being applied to the plate 398 is here assumed to be alternately positive and negative. The current will pass from plate 398 to cathode 400 as mentioned above when the plate 398 is positive. During the interval when the voltage at 398 is negative no current will flow from plate 398 to cathode 400. However, when the current is flowing from plate 398 to cathode 400, a charge is built up on condenser 380. When the current from 398 to 400 is shut off, condenser 380 will maintain plate 402 at a positive potential during its discharge period. Then current will continue to flow from plate 402 to cathode 406. The discharge period of condenser 380 is longer than one-half cycle of the input voltage, so that this discharge will continue during the negative half cycle and current will flow continuously from 402 to 406 even though the plate 398 is negative. Thus the coil 408 of relay 370 will be maintained energized during the negative half cycles of the alternating current and the contacts 424 and 422 thereof will not chatter.

Control panel 364 of control box 356 (Figures 21 and 19) is also provided with the contact block 458 having contacts 386 to which supply lines 460 and 462 are connected, said supply lines being connected to a suitable source of current supply. One of the connectors 386 is connected through line 464 to one side of solenoid 258 (Figures 21 and 11), the other side of said solenoid being connected through line 466 to one side of the pressure switch 362 (Figures 21, 20 and 19), the other side of said pressure switch being connected through line 468 to the other contact 386, said last named contact 386 being electrically connected through jumper 426 to contact 470.

Contact 470 is electrically connected through conductor 472 to one side of the latching solenoid 366 (Figures 21, 22, 16 and 17), the other side of said latching solenoid 366 being connected through conductor 474 to contact 476. Contact 476 is connected through conductor 478 to terminal 422 of relay 370 (Figures 21, 22 and 19) and contact 424 of said relay is electrically connected through conductor 480 to contact 386 which is connected to conductor 464.

Referring now to the diagrammatic construction illustrated in Figure 18, the pump 20 is shown as connected through the suction stub 482 to suitable source of fluid supply 484, the outlet side of the pump being connected to the inlet side of the meter 64 which in turn is connected either directly, or through a hose reel (not shown) or other suitable storage means, to a flexible collapsible hose 420. The end of said hose is provided with a suitable nozzle or nozzle coupling 486 which may be of the well-known Carter type or as shown and described in United States Letters Patent No. 2,461,312, granted February 8, 1949, to J. Gordon Dahlem, for Hose Fitting Mechanism, and said nozzle 486 is adapted to be coupled to a suitable coupling indicated generally at 488 provided on the receptacle 490 to be filled, which receptacle is grounded as at 492 during the filling operation. The couplings 486 and 488 are provided with suitable valve means which are only operable to open position when liquid under a predetermined pressure is supplied.

Pump 20 is adapted to be grounded as at 494 and the static wire 418 is provided with a suitable connector adapted to be electrically connected as to the jack 496 carried by the tank 490. The jack is electrically connected as through conductor 498 to one side of the normally closed micro-switch (pressure safety switch) 500, the other side of said micro-switch being electrically connected as at 502 to the ground 492.

Switch 500 is mounted on the pressure motor indicated generally at 504. The pressure motor comprises an upper casing member 506, and a lower casing member 508 between which is mounted a flexible diaphragm 510. The cavity 512 between the diaphragm 510 in the lower casing member is connected through the pipe 514 to the inside of the receptacle 490. The plunger 516 controlling the micro-switch 500 extends through the top casing member 506 and engages the diaphragm 510. When a predetermined amount of liquid is supplied to the receptacle 490, fluid pressure in the cavity 512 will increase causing an upward flexing of the diaphragm 510 to move the micro-switch 500 to open position, causing the system to become inoperative.

Assuming that registers 218 and 222 (Figure 1) are zeroized and the system is inoperative and it is desired to supply liquid to the container 490 (Figure 18), couplings 486 and 488 are connected together and static line 418 is connected to jack 496, micro-switch 500 being closed. The four-way valve is in the position as shown in Figures 7 and 10. If it is desired to supply a certain preselected quantity of liquid to the container 490, knobs 224 and 226 (Figure 1) are moved to set the register 222 to said preselected quantity.

Figures 16, 17:
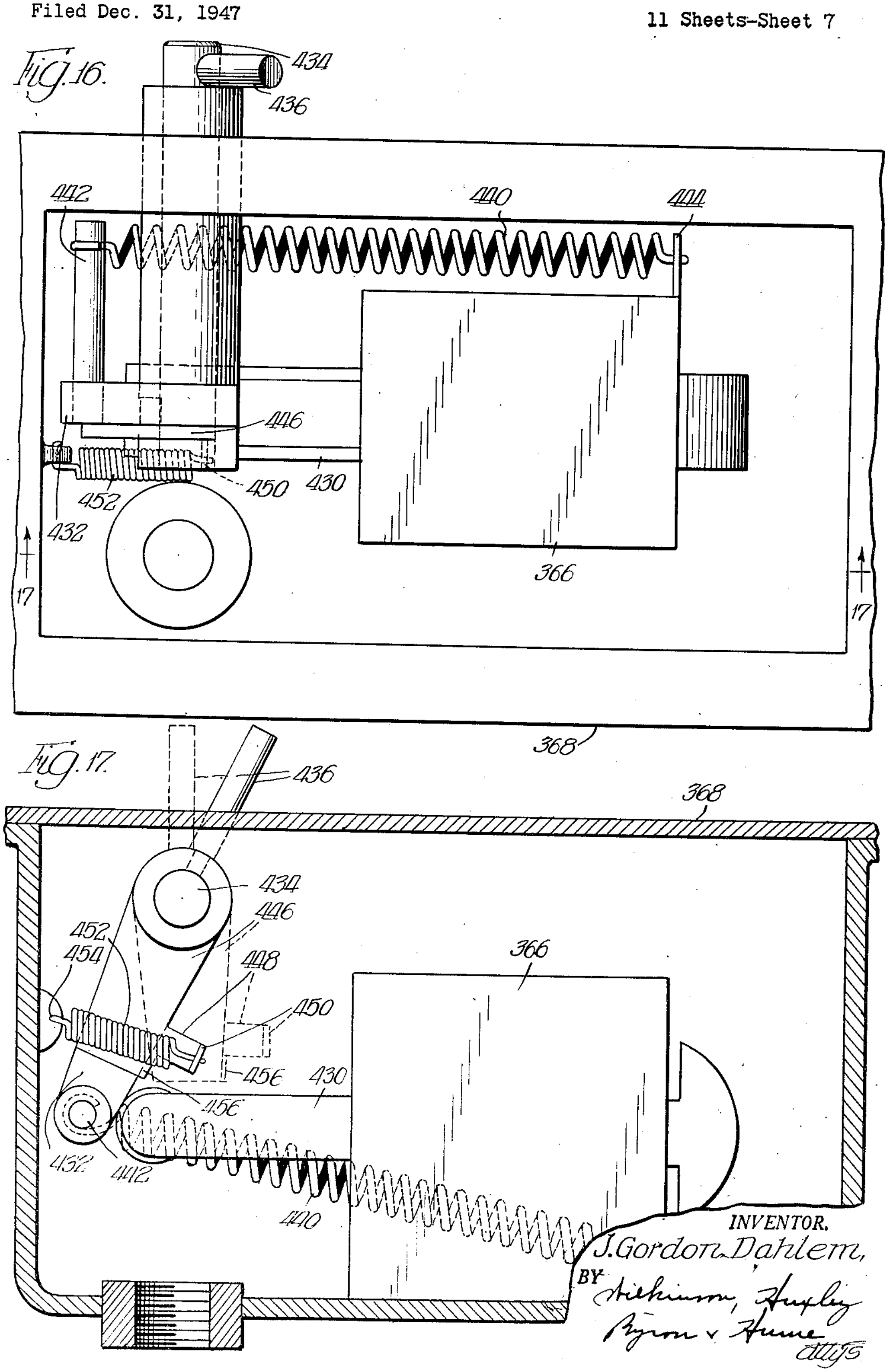
Figure 16 is a fragmentary top plan view of the (unlatching) solenoid operated control mechanism for the four-way valve.
Figure 17 is a sectional side elevation of the control mechanism shown in Figure 16, the same being taken substantially in the plane as indicated by the line 17—17 of Figure 16.

Lever 244 (Figure 1) is then moved in a counterclockwise direction against the spring 250 causing movement of the rod 238 to cause shoe 236 to move the lever 230 to close switch 228 (Figures 1 and 18) which through the electronic mechanism (Figures 19 to 22) previously described, will cause the latching solenoid 366 (Figures 16, 17, 21 and 22) to be energized moving the armature 430 to the position illustrated in Figures 16 and 17, which in turn causes lever 432 to move to the full line position shown in Figure 17. At this time lever 196 and latch lever 146 are in the position as shown in Figure 4 with the faces 192 and 194 (Figure 6) abutting. Accordingly, movement of latch lever 146, shaft 140, pin 436, shaft 434, and lever 448 is prevented so that lever 448 is in the dotted line position as shown in Figure 17 while lever 432 is in its full line position, spring 452 then being under tension.

Lever 166 (Figures 1, 2, 4, 5, 7 and 8) is then raised about its pivot 168 which raises the housing 154 upwardly so that lug 180 may move from the position shown in Figure 7 into a position where it enters the notch 176 as shown in Figure 5, but with it raised to a position opposite the notch 176, i. e., with the four-way valve in position shown in Figures 7 and 10. When lug 180 enters notch 176 spring 204 moves lever 196 and shaft 184 in a counter-clockwise direction to the relative positions shown in Figures 4 and 5, it being remembered that latch lever 146 moves with the housing 152 in its upward movement and at that time the lever 146 is raised to a position opposite to the position of notch 176 in Figure 7.

When the relative positions shown in Figures 4 and 5 are achieved, spring 452 of the unlatching solenoid operated control mechanism (Figures 16 and 17) will cause the lever 446 to move from the dotted line position as shown in Figure 17 to the full line position shown in said figure whereupon the pin 436 will move latch lever 146 (Figure 6) and shaft 140, and consequently latch 148 to a position where edge 214 (Figure 4) of lever 146 overlies edge 216 of the lever 196, thus preventing clockwise rotation of lever 196, shaft 184 and lug 180 (Figure 5), whereby said lug is maintained in the slot 176. Downward movement of the lever 166 about its pivot 168, therefore, causes downward movement of the valve stem 86 from the position shown in Figures 7 and 10 to the position shown in Figures 5 and 9. Thus, after this operation valve poppets 116 and 82 will be in open position with respect to the seats 106 and 74.

It is assumed that at this time the pump 20 is being actuated and thus liquid will flow from the source of supply 484 (Figure 18) through line 482 to line 58 (Figures 2, 9 and 10) into the valve casing 40 through the connection 56 entering the casing 40 through the supply port 76 (Figures 4, 5, 9 and 10). From the supply port liquid passes to the port 72 and to the inlet 32 of the pump 20. Liquid will pass through pump outlet 42, through valve 50, and through connection 52 into the connection 54 of the valve casing 40 entering port 104 (Figures 5 and 9) passing seat 106 into passage 108, and thence in back of valve 82, and liquid will flow out of port 112 through pipe 66 (Figures 1 and 2) into the inlet side of the meter 64. Liquid passing through meter 64 will pass to dispensing means 70 which in turn is connected to the flexible collapsible hose 420 (Figure 18).

As the hose is filled, pressure is applied through opening 358 (Figures 5 and 7) to the pressure control switch 362 (Figures 19, 20 and 21), closing the switch 362. Closure of the switch 362 causes electrical energy to flow from the contact 386 (Figure 21) through the line 464, solenoid 258, line 466, pressure switch 362, line 468 back to the other contact 386, thus energizing solenoid 258 (Figures 21, 11 and 12), causing the rotation of levers 266 and 276 in a clockwise direction (Figure 11) which causes engagement between gears 278 and 284. When the fitting 486 (Figure 18) is opened by the selected predetermined pressure all as described in said United States Letters Patent No. 2,461,312, or manually where a manual fitting is provided, liquid will flow into the receptacle 490 and flow will continue until the predetermined amount which has been set up upon the predetermined stop register 222 (Figure 1) has been reached, at which time suitable latching mechanism will cause movement of the rod 238 to permit the switch 228 (Figures 1 and 21) to be opened permitting the spring 250 (Figure 1) to return the actuating lever 244 to inoperative position as illustrated in Figure 1. Such opening of the switch 228 breaks the ground connection in line 416 deenergizing the solenoid 366 (Figures 22, 16 and 17) as described hereinabove.

Figure 6:
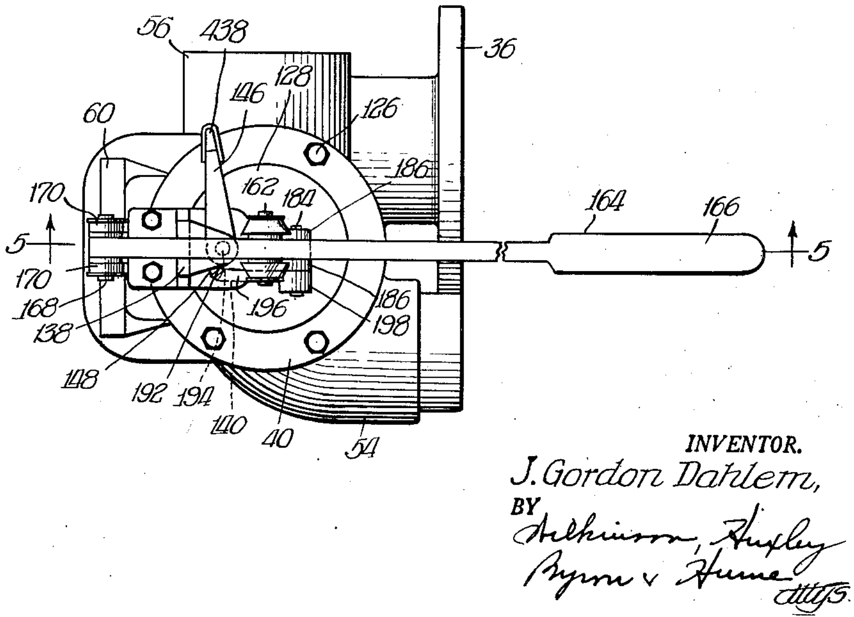
Figure 6 is a top plan view of the valve illustrated in Figures 4, 5, 7 and 9.

Deenergizing solenoid 366 permits spring 440 to move levers 432 and 446, shaft 434, and pin 436 in a counter-clockwise direction to the dotted line position as shown in Figure 17, and this movement in turn moves the lever 146 and shaft 140 in a counter-clockwise direction as viewed in Figure 6, moving latch 148 (Figure 4) from its position with its bottom face 214 overlying the top face 216 of lever 196 (Figures 5, 6 and 7) so that these faces clear one another, permitting clockwise rotation of lever 196 and withdrawal of lug 180 from engagement with the shoulder 178, whereupon spring 136 moves the valve stem 86 from the position shown in Figures 5 and 9 to the position shown in Figures 7 and 10.

In this position of the four-way valve, liquid can be withdrawn from the hose and returned to the source of supply. This is accomplished as liquid will be drawn from the hose 420, the nozzle valve being closed, back through the line 70 (Figures 1 and 2) through the meter 64, connection 66, port 112 (Figures 1, 2, 4 to 10) of the four-way valve, through passage 108 therein through port 110 to port 72, and into the suction connection 38 of the pump at 34, thus reducing the pressure in the system. Reduction of pressure in the system causes reduction in pressure in switch 362 whereupon it will open, causing solenoid 258 (Figures 11 and 12) to become deenergized moving levers 266 and 276 to disengage gears 278 and 284. Inasmuch as gears 278 and 284 are disengaged there will be no tendency to rotate the counters 218 and 222 in a reverse (subtracting) direction as liquid flows into the pump suction from the dispensing hose.

The returning liquid flows from the pump discharge 42 past the valve 50, through connection 52, into connection 54 of casing 40, then through port 104 (Figures 7 and 10) and port 76 to supply line 58, and thus through stub 482 (Figure 18) to the source of supply 484. Such action withdraws the liquid from the hose with fitting 486 closing on cessation of supply as described in said United States Letters Patent No. 2,461,312. Atmospheric pressure will cause the hose 420 to collapse to a readily handleable state and it can be stored in any convenient manner. It is to be noted that poppets 114 and 82 will always tightly seat due to the fact that one of said poppets, shown as the poppet 82, is movably or floatably mounted on the stem member 86, being resiliently urged toward seated position.

In the event that a predetermined pressure is built up below the cavity 512 (Figure 18) prior to the time that the predetermined stop mechanism associated with the register 222 becomes effective, switch 500 will be opened, breaking the circuit and causing the system to become inoperative to supply additional liquid to receptacle 490. If it is desired to withdraw liquid from a compartment as from the chamber 490, a manually operable fitting, such as a Carter fitting, will be used and will be open with the valve equipment in the position shown in Figures 7 and 10. If it is desired to meter such pumped off liquid, the mechanism shown in Figure 15 would be the one used at 254 of Figure 1 and the button 344 would be pulled out. As previously described, this will cause engagement of the meter driven gear 332 and gear 338 to drive register gear 318, thus causing the counter to be run in an adding (registering) direction even though the meter is running in a reverse direction.

Figure 25:
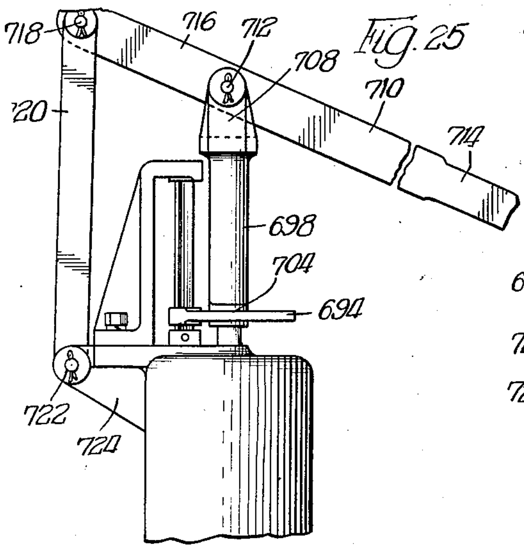
Figure 25 is a fragmentary elevation of the top of the valve shown in Figures 23 and 24 showing the mechanism in delivery position.
Figure 23:
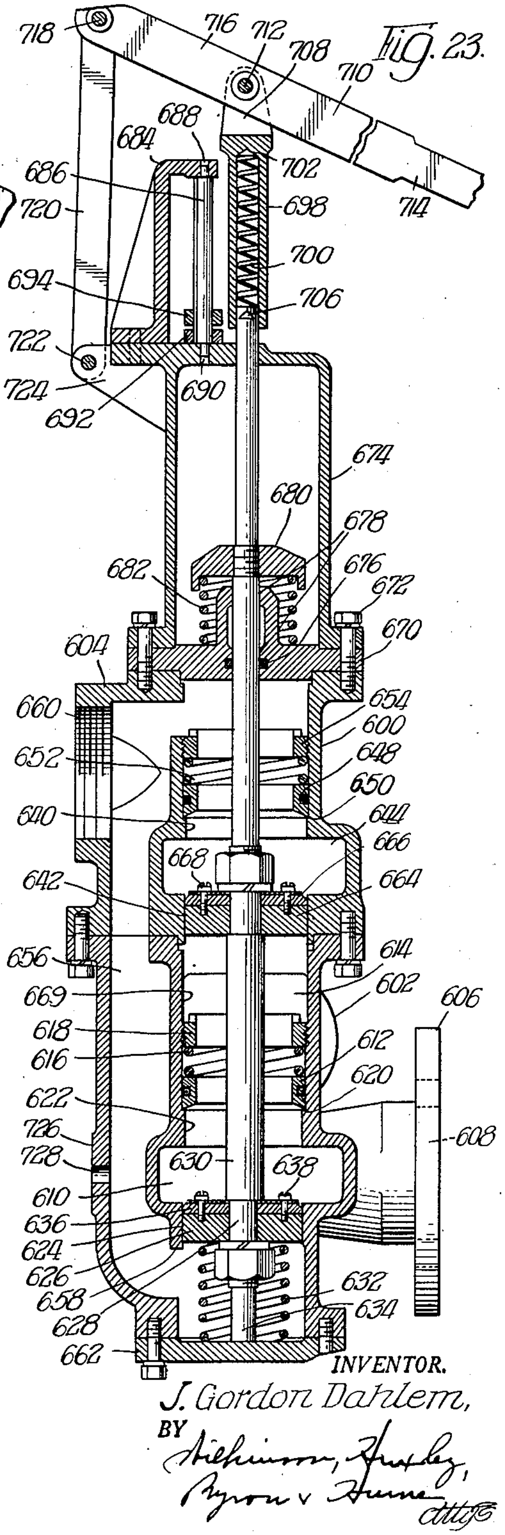
Figure 23 is a sectional elevation corresponding to Figures 5 and 9 of a modified form of four-way valve.

Referring to the modified form of four-way valve shown in Figures 23, 24 and 25, this valve is for use in a similar manner as that for which the valve illustrated in Figures 4 to 8 inclusive is intended. The modified form of four-way valve comprises the casing 600 provided with an inlet connection 602 adapted to be connected to a suitable source of supply. The casing 600 is provided with the outlet connection 604 adapted to be connected to the inlet 62 (Figures 1 and 2) of the meter 64 through the connection 66. Casing 600 is also provided with the flange 606 of passage 608, the flange 606 being adapted to be connected to the flange 34 of the pump inlet. Passage 608 communicates with the port 610 which in turn communicates through lower valve seat 612 with the supply port 614 which communicates with the fitting 602.

In Figure 23 the lower seat 612 is shown as being slightly movable against spring 616 which is seated at one end on seat 612 and at the other end on the adjustable stationary collar 618, the seat 612 being adapted to abut a shoulder 620. It is of course understood that seat 612 may be a fixed seat such as shown in Figure 5 at 74.

Casing 600 is provided with the valve guides 622 and 624 for the reception of the lower poppet 626 fixedly mounted on the reduced end 628 of the valve stem 630. If the lower seat is fixed, poppet 626 may be made movable with respect to its valve stem, being resiliently mounted on its stem as illustrated in Figure 5 in the case of valve 82. A cushioning spring 632 may be provided to be carried by poppet 626 and conveniently disposed around the stop extension 634 of the valve stem 630. The poppet is provided with suitable seat facing 636 secured thereto as at 638, the facing being adapted to abut seat 612 when in seated or closed position. With the poppet in the position shown in Figure 23, there is communication between port 610 and port 614.

The casing 600 is also provided with the valve guides 640 and 642 disposed on opposite sides of the port 644 which is connected to the pump discharge through fitting 646. The casing is also provided with the valve seat 648 shown as movable, being limited in its downward position by means of the shoulder 650, one end of spring 652 seating on said seat, the other end being adapted to be retained by the adjustable stationary collar 654. Seat 648 is disposed adjacent the guide 640 and disposed intermediate port 644 and the by-pass passage 656 disposed in casing 600, passage 656 communicating through port 658 with the side of poppet 626 opposite to the facing 636 and communicating through passage 660 of fitting 604 with piping 66. The lower end of casing 600 is closed by means of the cap 662 removably secured thereto.

Upper poppet 664 is fixed to the valve stem 630 and is provided with facing 666 secured thereto as at 668 and adapted to seat on seat 648 when the valve is in closed position. Thus, in effect, poppets 626 and 664 are slidably mounted in inner cylinder 659, spaced from casing 600 to form passage 656 and having ports 610, 614 and 644. The top of the casing 600 is closed by means of the closure plate 670 secured to the casing at 672, the dome or housing 674 being also secured to the casing by the securing means 672. The closure plate 670 is provided with suitable packing 676 and spaced stem guides 678, the valve stem 630 extending through the closure plate (and guides) and being provided with the spring seat 680, spring 682 being disposed between the seat 680 and the closure plate urging the poppets 626 and 664 (upwardly) toward closed position on their respective seats 612 and 648.

Bracket 684 is fixed to the top of the dome 674 and the opposite ends of rotatable shaft 686 are journalled in the bracket 684 as at 688, and in the top of the dome 674 as at 690.

Latch operating lever 692 (similar to lever 146) is fixed to shaft 686 and latch 694 is non-rotatably but slidably mounted on shaft 686, lever 692 being provided with the strap 696 adapted to have cooperative relation with pin 436 (Figures 16 and 17) in the same manner as lever 146. The upper end of valve stem 630 projects through the dome 674 and is provided with housing 698, one end of spring 700 being adapted to be seated on the end of stem 630 and the other end seating on the seat 702 in housing 698.

Housing 698 is provided with latch opening 704 adapted to be aligned with the notch 706, provided in the stem, whereby latch member 694 can be moved into the opening 704 to engage in the notch 706, thereby connecting housing 698 to stem 630. The upper end of housing 698 is provided with spaced lugs 708 and operating handle 710 is pivoted intermediate its ends as at 712 to said lugs, one end 714 of said handle being adapted to be manually moved, the other end 716 thereof being pivoted as at 718 to the upper end of links 720, the lower end of said links being pivoted as at 722 to the bracket 724 provided on the dome 674. Housing 600 is provided with the boss 726 apertured as at 728 (similar to 358) to provide means for operating the pressure switch 362 (Figures 19, 20 and 21).

When this form of four-way valve is used in place of that shown and described in Figures 5 to 10 inclusive, the operation of the system is very similar to that already described, it being noted that operation of lever 692 engages or disengages lever 694 from its connecting position with respect to valve stem 630 and housing 698. If lever 694 is disengaged, the stem 630 and poppets 624 and 664 will be moved upwardly to seat at 648 and 612 by spring 682. Movement of the handle 710 upwardly will engage housing 698 to valve stem 630 through latch member 694, at notch 706. Downward movement of handle 710 moves poppets 664 and 626 to open position corresponding to that described with respect to Figures 5 and 9, and the four-way valve functions as described with respect to those figures. Movement of the poppets to the position shown in Figure 23, causes the four-way valve to function in the same manner as described in Figures 5 and 10, except handle 710 must be held down manually.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In liquid dispensing apparatus, the combination of a liquid flow line, liquid forcing means for forcing liquid through said line, delivery means for dispensing liquid from the outlet side of said liquid flow line during a dispensing operation, said delivery means comprising a flexible, collapsible hose, means for closing the dispensing end of said hose when the pressure within said hose drops below a predetermined point, valve means for permitting supplying or withdrawing liquid to or from said hose, control means for making said liquid forcing means operative and inoperative at will, and means between said control means and valve means for causing said valve means to be put in hose evacuating condition if said control means is rendered inoperative, and means for registering the amount of liquid flowing out of said dispensing end of said hose.

2. In liquid dispensing apparatus, the combination of a pump having an inlet and an outlet, a normally closed valve in said outlet opening away from said pump, a four-way valve, said four-way valve comprising a casing, said casing having four spaced ports formed therein, a wall disposed in said casing forming a cylinder open at each end and communicating with the lower three of said spaced ports, the middle of said three spaced ports being adapted to be connected to a source of supply, the lower of said three spaced ports being connected to the pump inlet, and the upper of said three spaced ports being connected to the pump outlet, said wall and casing forming a passage communicating with the uppermost spaced port, a lower closure for the lower end of said casing, an upper closure for the upper end of said cylinder, an upper seat in said cylinder between the uppermost port and the upper of the three ports, a lower seat between the lower and middle of the three ports, spaced poppets movable in said cylinder between open and closed position with respect to their respective seats, in open position said poppets causing the port connected to the source of supply to be connected to the port to the pump inlet and causing the port to the pump outlet to be connected to the uppermost port, in closed position said poppets causing the uppermost port to be connected to the port to the pump inlet and causing the port to the pump outlet to be connected to the port to the source of supply, a valve stem connecting said poppets in predetermined relation and extending through the upper closure, resilient means urging said stem to valve closed position, means for moving said stem to valve open position, means for releasably connecting said last named means to said stem, means for retaining said valves in open position, electrical means adapted to be conditioned to permit connection between said stem and the releasable connecting means, said electrical means being adapted to be conditioned to cause release of said releasable connecting means and stem to thereby permit said last named resilient means to close said poppets, a meter the inlet side of which is connected to the uppermost port of said four-way valve, the outlet side of said meter being adapted to be connected to dispensing means, a register operated by said meter for indicating flow therethrough, control means for causing operation of said pump, means for connecting and disconnecting said register from said meter, means controlled by said electrical means for operating said last named means, and pressure responsive means operable when pressure in said passage of said four-way valve reaches a predetermined amount to permit operation of said four-way valve to connect the source of supply with the pump inlet.

3. In liquid dispensing apparatus, the combination of a pump having an inlet and an outlet, a four-way valve connected to a source of supply and to the pump inlet and pump outlet, a meter having an inlet connected to said four-way valve and to dispensing means, a register operated by said meter to indicate the passage of liquid through said meter, connecting means between said meter and register for connecting and disconnecting said meter and register, electrically operable means for operating said connecting means, manually operable means for operating said four-way valve to cause said source to be connected to the pump inlet whereupon the pump outlet is connected to the meter inlet, electrically operative means for conditioning the four-way valve for such operation, means for urging said four-way valve to a position where the pump outlet is connected to the source whereupon the pump inlet is connected to the meter inlet means for operating said electrically operable means to disconnect the register from the meter and thereafter connect the meter and register to subtract when the meter inlet is connected to the pump inlet, and means controlled by the pressure in said four-way valve to condition said four-way valve to connect the pump outlet and meter inlet.

4. In liquid dispensing apparatus, the combination of a pump having an inlet and an outlet, a four-way valve connected to a source of supply and to the pump inlet and pump outlet, a meter having an inlet connected to said four-way valve and to dispensing means, a register operated by said meter to indicate the passage of liquid through said meter, connecting means between said meter and register for connecting and disconnecting said meter and register, electrically operable means for operating said connecting means, manually operable means for operating said four-way valve to cause said source to be connected to the pump inlet whereupon the pump outlet is connected to the meter inlet, electrically operative means for conditioning the four-way valve for such operation, means for urging said four-way valve to a position where the pump outlet is connected to the source whereupon the pump inlet is connected to the meter inlet, means for operating said electrically operable means to disconnect the register from the meter and thereafter connect the meter and register to register the amount of liquid withdrawn from the meter when the meter inlet is connected to the pump inlet, and means controlled by the pressure in said four-way valve to condition said four-way valve to connect the pump outlet and meter inlet.

5. In liquid dispensing apparatus, the combination of a pump having an inlet and an outlet, a four-way valve connected to a source of supply and to the pump inlet and pump outlet, a meter having an inlet connected to said four-way valve and to dispensing means, a register operated by said meter to indicate the passage of liquid through said meter, connecting means between said meter and register for connecting and disconnecting said meter and register, electrically operable means for operating said connecting means, manually operable means for operating said four-way valve to cause said source to be connected to the pump inlet whereupon the pump outlet is connected to the meter inlet, electrically operative means for conditioning the four-way valve for such operation, means for urging said four-way valve to a position where the pump outlet is connected to the source whereupon the pump inlet is connected to the meter inlet means for operating said electrically operable means to disconnect the register from the meter and thereafter connect the meter and register to subtract when the meter inlet is connected to the pump inlet, and means controlled by the pressure in said four-way valve to condition said four-way valve to connect the pump outlet and meter inlet, said dispensing means being adapted to be connected to a receptacle to be filled, electrical means between said receptacle and dispensing means permitting operation of the beforementioned electrically operable and electrically operative means, and means operative when the liquid level in said receptacle reaches a predetermined level to render said electrical means inoperative to thereby prevent further dispensing to said receptacle.

6. In liquid dispensing apparatus, the combination of a pump having an inlet and an outlet, a four-way valve connected to a source of supply and to the pump inlet and pump outlet, a meter having an inlet connected to said four-way valve and to dispensing means, a register operated by said meter to indicate the passage of liquid through said meter, connecting means between said meter and register for connecting and disconnecting said meter and register, electrically operable means for operating said connecting means, manually operable means for operating said four-way valve to cause said source to be connected to the pump inlet whereupon the pump outlet is connected to the meter inlet, electrically operative means for conditioning the four-way valve for such operation, means for urging said four-way valve to a position where the pump outlet is connected to the source whereupon the pump inlet is connected to the meter inlet, means for operating said electrically operable means to disconnect the register from the meter and thereafter connect the meter and register to register the amount of liquid withdrawn from the meter when the meter inlet is connected to the pump inlet, and means controlled by the pressure in said four-way valve to condition said four-way valve to connect the pump outlet and meter inlet, said dispensing means being adapted to be connected to a receptacle to be filled, electrical means between said receptacle and dispensing means permitting operation of the beforementioned electrically operable and electrically operative means, and means operative when the liquid level in said receptacle reaches a predetermined level to render said electrical means inoperative to thereby prevent further dispensing to said receptacle.

7. In liquid dispensing apparatus, the combination of a hose having a nozzle at its dispensing end for opening and for closing its dispensing end, means for pumping liquid into or out of said hose, a meter between said last named means and hose operable by the liquid pumped through said meter, registering means adapted to be operated by said meter for registering the liquid pumped through said meter, means between said meter and registering means for connecting and disconnecting said meter and registering means, pressure actuated means connected to said first named means and actuated between a plurality of positions by the pressure supplied by said first named means to said hose, said pressure actuated means being operatively connected to the connecting means between said meter and registering means to connect said meter and registering means when said pressure actuated means is in one position and to disconnect said registering means and meter when said pressure actuated means is in another position.

8. In liquid dispensing apparatus, the combination of a liquid flow line, liquid forcing means for forcing liquid through said line, delivery means for dispensing liquid supplied through said flow line, said delivery means comprising a flexible, collapsible hose adapted to be dry and collapsed when the apparatus is in normal inoperative condition, means for closing the delivery end of the hose, control means for controlling supplying or removing the liquid to or from said hose, withdrawing liquid from said hose causing said hose to collapse, said control means including a four-way valve, said valve being movable to connect the outlet or inlet of the liquid forcing means to said flow line, resilient means urging said valve to a position to connect the inlet of said liquid forcing means to said flow line, latch mechanism movable to latched position to render said last named means inoperative to move the valve to a position to connect the outlet of said liquid forcing means to said flow line, circuiting for controlling operativeness of said control means, said circuiting including unlatching mechanism connected to said latching mechanism and adapted to be energized upon operation of the liquid forcing means to resist movement of the latching mechanism toward unlatched position, deenergizing said unlatching mechanism, moving it to a position to unlatch said latching mechanism permitting said resilient means to move said valve to a position to connect the inlet of said liquid forcing means to said flow line, a pressure responsive device operative by pressure supplied to said flow line for rendering said circuiting effective, a meter in said liquid flow line, and a register adapted to be operated by said meter.

9. In liquid dispensing apparatus, the combination of a liquid flow line, liquid forcing means for forcing liquid through said line, delivery means for dispensing liquid from the outlet side of said liquid flow line during a dispensing operation, said delivery means comprising a flexible, collapsible hose, means for closing the dispensing end of said hose, control means for controlling supplying or withdrawing liquid to or from said hose, withdrawing liquid from said hose causing said hose to collapse, said control means including a four-way valve, said valve being movable to connect the outlet or inlet of the liquid forcing means to said flow line, resilient means urging said valve to a position to connect the inlet of said liquid forcing means to said flow line, latching mechanism movable to latched position to render said last named means inoperative to move the valve to a position to connect the outlet of said liquid forcing means to said flow line, circuiting for controlling operativeness of said control means, said circuiting including unlatching mechanism connected to said latching mechanism and adapted to be energized upon operation of the liquid forcing means to resist movement of the latching mechanism toward unlatched position, deenergizing said unlatching mechanism, moving it to a position to unlatch said latching mechanism permitting said resilient means to move said valve to a position to connect the inlet of said liquid forcing means to said flow line, a pressure responsive device operative by a predetermined pressure supplied to said flow line for rendering said circuiting effective, said predetermined pressure being at a point where said hose is full of liquid, a meter in said liquid flow line, a register adapted to be operated by said meter, means controlled by said pressure responsive means for connecting or disconnecting said register from said meter, connecting operation occurring at said predetermined pressure and disconnecting operation occurring below said predetermined pressure.

10. In liquid dispensing apparatus, the combination of a pump having an inlet and an outlet, a normally closed valve in said outlet opening away from said pump, a four-way valve, said four-way valve comprising a casing, said casing having four spaced ports, a wall disposed in said casing forming a cylinder open at each end and communicating with three of said spaced ports, one of said three spaced ports being adapted to be connected to a source of supply, another of said three spaced ports being connected to the pump inlet, and the other of said three spaced ports being connected to the pump outlet, said wall and casing forming a passage communicating with the spaced port other than of the three spaced ports, a closure for the one end of said casing, a closure for the other end of said cylinder, a seat in said cylinder between the last named port and the last named of the three spaced ports, a seat between the first two named of the three spaced ports, spaced poppets movable in said cylinder between open and closed position with respect to their respective seats, in open position said poppets causing the port connected to the source of supply to be connected to the port to the pump inlet and causing the port to the pump outlet to be connected to the port other than the three spaced ports, in closed position said poppets causing the last named port to be connected to the port to the pump inlet and causing the port to the pump outlet to be connected to the port to the source of supply, a valve stem connecting said poppets in predetermined relation and extending through one of the closures, resilient means urging said stem to valve closed position, means for moving said stem to valve open position, means for releasably connecting said last named means to said stem, means for retaining said valves in open position, electrical means adapted to be conditioned to permit connection between said stem and the releasable connecting means, said electrical means being adapted to be conditioned to cause release of said releasable connecting means and stem to thereby permit said last named resilient means to close said poppets, a meter the inlet side of which is connected to the last named port of said four-way valve, the outlet side of said meter being adapted to be connected to dispensing means, a register operated by said meter for indicating flow therethrough, control means for causing operation of said pump, means for connecting and disconnecting said register from said meter, means controlled by said electrical means for operating said last named means, and pressure responsive means operable when pressure in said passage of said four-way valve reaches a predetermined amount to permit operation of said four-way valve to connect the source of supply with the pump inlet.

J. GORDON DAHLEM.

REFERENCES CITED

The following references are of record in the file of this patent:

UNITED STATES PATENTS

| Number | Name | Date |
|---|---|---|
| 294,674 | Richter | Mar. 4, 1884 |
| 318,247 | Harvey | May 19, 1885 |
| 395,625 | Moore | Jan. 1, 1889 |
| 1,211,040 | Baird | Jan. 2, 1917 |
| 1,385,019 | Mathieu | July 19, 1921 |
| 1,775,293 | Pfening et al. | May 16, 1930 |
| 1,842,825 | Cunningham | Jan. 25, 1932 |
| 1,909,733 | Thwaits | May 16, 1933 |
| 1,974,857 | Winton | Sept. 25, 1934 |
| 2,017,345 | Granberg | Oct. 15, 1935 |
| 2,045,823 | Barrow | Jan. 30, 1936 |
| 2,152,084 | Paine | Mar. 28, 1939 |
| 2,362,559 | Jauch et al. | Nov. 14, 1944 |

FOREIGN PATENTS

| Number | Country | Date |
|---|---|---|
| 743,171 | France | Mar. 25, 1933 |
| 239,250 | Germany | Dec. 23, 1910 |